United States Patent
Servida

(10) Patent No.: US 9,758,390 B2
(45) Date of Patent: Sep. 12, 2017

(54) METHOD AND APPARATUS FOR TREATING A FLUID CONTAINING IONIZED PARTICLES

(71) Applicant: IDROPAN DELL'ORTO DEPURATORI S.R.L., Milan (IT)

(72) Inventor: Tullio Servida, Milan (IT)

(73) Assignee: IDROPAN DELL'ORTO DEPURATORI S.R.L., Milan (IT)

(*) Notice: Subject to any disclaimer, the term of this patent is extended or adjusted under 35 U.S.C. 154(b) by 214 days.

(21) Appl. No.: 14/418,954

(22) PCT Filed: Jul. 30, 2013

(86) PCT No.: PCT/IB2013/001700
§ 371 (c)(1),
(2) Date: Feb. 2, 2015

(87) PCT Pub. No.: WO2014/020422
PCT Pub. Date: Feb. 6, 2014

(65) Prior Publication Data
US 2015/0166374 A1 Jun. 18, 2015

(30) Foreign Application Priority Data
Aug. 2, 2012 (IT) .............................. PD2012A0239

(51) Int. Cl.
C02F 1/469 (2006.01)
C02F 1/461 (2006.01)
C02F 1/46 (2006.01)

(52) U.S. Cl.
CPC .......... *C02F 1/4691* (2013.01); *C02F 1/4602* (2013.01); *C02F 1/46104* (2013.01);
(Continued)

(58) Field of Classification Search
CPC .................................................. C02F 1/46104
(Continued)

(56) References Cited

U.S. PATENT DOCUMENTS

| 5,147,533 A | 9/1992 | Lipshultz |
| 5,360,540 A | 11/1994 | Andelman |

(Continued)

FOREIGN PATENT DOCUMENTS

| JP | H09195328 A | 7/1997 |
| WO | 2012017297 A1 | 2/2012 |

*Primary Examiner* — Brian W Cohen
(74) *Attorney, Agent, or Firm* — Mark M. Friedman

(57) ABSTRACT

Method for treating a fluid containing ionized particles, by means of an apparatus provided with a hydraulic circuit (100) intercepted by an immiscible storage tank and by a cyclically regenerating filtering unit (3, 3A, 3B), connected in parallel to the tank. The following are provided for: a supply pipe connected to the hydraulic circuit (100) upstream of the immiscible storage tank for introducing fluid to be purified and an extraction pipe (9) connected to the hydraulic circuit (100) downstream of the filtering unit (3, 3A, 3B) for conveying purified fluid to the user. The method cyclically comprises a circulation step, in which the fluid circulates through the filtering unit (3, 3A, 3B) and the immiscible tank (2), accumulating in the latter an operating amount of fluid with increasing concentration of ionized particles, and a production step in which an operating amount of fluid to be purified is introduced into the hydraulic circuit (100) by the supply pipe such that an equivalent operating amount of fluid with increasing concentration of ionized particles previously accumulated in the tank is forced to exit from the tank itself and pass through the filtering unit (3, 3A, 3B) in order to be further purified and then drawn by the extraction pipe (9).

9 Claims, 6 Drawing Sheets

(52) U.S. Cl.
CPC .... *C02F 2209/005* (2013.01); *C02F 2209/05* (2013.01); *C02F 2209/44* (2013.01); *C02F 2301/046* (2013.01)

(58) Field of Classification Search
USPC ............... 204/665, 666, 660; 205/742–744, 205/746–751
See application file for complete search history.

(56) References Cited

U.S. PATENT DOCUMENTS

| | | |
|---|---|---|
| 5,620,597 A | 4/1997 | Andelman |
| 6,413,409 B1 | 7/2002 | Otowa et al. |
| 2002/0167782 A1 | 11/2002 | Andelman |

METHOD AND APPARATUS FOR TREATING A FLUID CONTAINING IONIZED PARTICLES

FIELD OF APPLICATION

The present invention regards a method and an apparatus for treating a fluid containing ionized particles, according to the preamble of the respective independent claims.

More in detail, the present method and the apparatus are intended to be advantageously employed for removing undesired concentrations of contaminants from a fluid, e.g. constituted by salts dissolved inside the same fluid, i.e. for concentrating ionized particles inside a fluid, particularly a fluid for industrial processes, in order to facilitate the recovery or disposal of such particles.

The aforesaid apparatus and the aforesaid method are particularly adapted to be employed for the desalination of water of a water supply preferably in a home or professional setting in order to soften the water of aqueduct distributed through the water supply system. In such scope, there is usually the need to use water having a low salt content, both for diet purposes and for specific applications such as machines for washing and in particular for dishwashing and clothes washing machines. The apparatus and the method can therefore be usefully employed for example in home kitchens or even in the kitchens of bars, restaurants, dining halls, i.e. for serving artisanal shops such as bakeries, pastry shops etc.

The apparatus and the method according to the invention can be intended for multiple other applications both in industrial and civil fields, such as the desalination of seawater, the softening of particularly hard waters, the removal from water of salts (such as chlorides and sulfides), nitrates, nitrites, ammonia, heavy metals, organic substances or micro-pollutants in general, or for the deionization of fluids e.g. for industrial processes or for the concentration of polluting substances that are difficult to dispose of or are advantageous to recover for a reuse.

The present invention is therefore generally inserted in the industry field for treating fluids, having the object of filtering ionized particles from the latter, i.e. to concentrate such particles in a reduced volume of fluid; the present invention is also inserted in the industrial field of the production of domestic and professional apparatuses for water treatment.

STATE OF THE ART

As is known, numerous apparatuses are present on the market known as "decalcifiers" or "softeners" or more generally as "purifiers" which have the main object of reducing the water hardness level, i.e. substantially reducing the content of calcium and magnesium dissolved in the water.

Such apparatuses generally employ filtering means with mechanical filters, with active carbon cartridges, with ionic exchange resins, or more frequently with reverse osmosis membranes.

More in detail, as is known, the apparatuses for the treatment of fluids with reverse osmosis force the pressurized water to pass through semi-permeable membrane which allows the passage of the pure (permeate) water and retains most of the salts (retentate or concentrate). Such apparatuses are usually composed of multiple filters in series with each other having different characteristics. For example, the combined use is known of an active carbon filter interposed in series with reverse osmosis filters having meshes with different micrometer dimensions.

Usually, the apparatuses intended for the production of filtered water for food use, such as those described in the U.S. Pat. No. 5,147,533, are provided with a dedicated tank for accumulating water and a system for distributing water from the tank; this because the water is treated with rather slow filtering processes, such that the desalinated water production speed is incompatible with a use requiring large flow rates, like that generally required with the opening of a tap (even if this is usually for limited time intervals).

In order to avoid the use of tanks for accumulating water, fluid treatment apparatuses are also widespread, in particular of reverse osmosis type, which are rather voluminous and capable of treating—due to high pressures—large flow rates of water, e.g. on the order of 1 liter per minute. Nevertheless, such apparatuses are rather costly, requiring the consumption of a considerable amount of electrical energy; they have also proven unsuitable for domestic use due to the presence of high power pumps, which consequently cause noise and vibrations that are not usually well tolerated in the home setting where they are intended to work.

Otherwise, if the apparatus is intended to serve household appliances or the water supply system of a building, for example, it will generally suffice that it produce a low softening of the water; therefore, it will usually mounted in line with the apparatus or with the system to be served, without requiring the presence of a tank for accumulating water. The water treatment apparatuses described above and their functioning method for desalinating water from the water supply system have proven in practice that they do not lack drawbacks.

One drawback lies in the frequent and periodic maintenance that the apparatuses require in order to be maintained perfectly functioning without decreasing water softening performances over time.

A further drawback thereof lies in the low softened water production capacity, except with the use of very bulky and costly plants.

Apparatuses for purifying fluids are known which exploit the principle of capacitive deionization for removing the charged particles; for such purpose, they use flow-through capacitors conventionally organized in one or more cells connected in series or in parallel with each other.

More in detail, each cell is formed by one or by multiple flow-through capacitors, each of which in turn provided with a plurality of superimposed electrodes, between which the fluid to be purified is made to pass with the purpose of concentrating a solute with ionized particles, i.e. with the object of obtaining a solvent cleaned of such particles.

The functioning of such capacitors provides for the alternation of operating steps, in which the concentration of the ions present in the fluid takes place at the opposite electrodes, and regeneration steps, in which the ions accumulated on the electrodes are removed by means of the aforesaid discharge flow.

Flow-through capacitors of the above-indicated type are, for example, described in the patents U.S. Pat. No. 6,413,409 and U.S. Pat. No. 5,360,540.

According to the applications, purification apparatuses may be required that are equipped with numerous cells, each having one or more flow-through capacitors, for treating large fluid volumes, i.e. for lowering, in multiple successive steps, the conductivity of a fluid flow until it is brought to desired values.

In particular, it is known to use apparatuses with flow-through capacitors for desalinating the seawater. Advantageously, the water is brought from the values of salinity of seawater, usually on the order of 50,000 µS, to the values of drinking water, usually on the order of hundreds of µS, through the use of multiple apparatuses arranged in series, in which the salinity is reduced in percentages progressively decreasing in absolute terms, for example in 5-7 passage stages in capacitors arranged in succession. The drawback of such known desalination method that makes use of apparatuses with flow-through capacitors lies in having to use a high number of passages in capacitors arranged in succession and hence high plant and energy consumption costs.

Indeed, as is known, each filtering stage allows the apparatus to reduce only a percentage of the salinity of the water fed to the same apparatus.

Consequently, in absolute terms, the capacitors of the final stages have a lower yield than those of the first stages, capturing a lower amount of salts dissolved in the water, hence not reaching complete saturation of their electrodes and consequently not exploiting their pick-up possibilities in the best manner.

For example, in the case of application to a water supply system, the quality (the hardness) of the water flow exiting from the apparatus is a function of the quality of the incoming water. The incoming water will have salinity dependent for example on seasonal variability, on atmospheric precipitation (particularly relevant if drawn from a well), on the presence of a contaminated water table, i.e. on the degradation of the characteristics of the same apparatus along with its general aging or dirtying.

Above all in cases of applications aimed to satisfy home use requirements, there is the need (up to now unmet) of obtaining, exiting from the apparatus, a same and constant water quality, i.e. always obtaining water with a same residual percentage of salinity, or more generally with a same residual percentage of contaminant particles, independent of the quality of the incoming water and the performance characteristics of the apparatus. Known from U.S. Pat. No. 5,620,597 is a method for treating a fluid containing ionized particles, by means of an apparatus provided with a hydraulic circuit intercepted by a cyclically regenerable filtering group, and comprising: feed piping connected to the hydraulic circuit for the introduction of a fluid to be cleaned, an extraction pipe connected to the hydraulic circuit downstream of the filtering unit in order to convey the purified fluid to the user.

Known from the patent WO 2012/017,297 (on behalf of the same applicant) is a method for treating a fluid containing ionized particles, by means of an apparatus provided with a hydraulic circuit intercepted by at least one immiscible storage tank, susceptible of containing at least one fluid reserve with variable concentration of ionized particles and by at least one cyclically regenerable filtering unit connected to said immiscible storage tank. The circuit also comprises a feed piping connected to said hydraulic circuit for the introduction of fluid to be cleaned; a suction pipe connected to said hydraulic circuit downstream of said filtering apparatus in order to convey the purified fluid to the user.

PRESENTATION OF THE INVENTION

In this situation, the problem underlying the present invention is therefore that of overcoming the drawbacks of the abovementioned prior art, by providing a method and an apparatus for treating a fluid containing ionized particles, which best exploit the capturing possibilities of the filtering unit used.

Another object of the present invention is to provide an apparatus for treating a fluid containing ionized particles which has a high yield.

Another object of the present invention is to provide a method and an apparatus for treating a fluid containing ionized particles which allow obtaining a cleaned fluid with constant quality, even upon varying the characteristics of the fluid to be cleaned.

Another object of the present invention is to provide a method and an apparatus for treating a fluid containing ionized particles which allow obtaining a cleaned fluid with constant quality that can be set to the desired value.

Another object of the present invention is to provide an apparatus for treating a fluid containing ionized particles which allow obtaining a cleaned fluid with quality independent of the aging or the soiling of the apparatus.

Another object of the present invention is to provide a method and an apparatus for treating the water of a water supply which allow obtaining cleaned water with quality independent of the seasonal variations or water table pollution.

Another object of the present invention is to provide a method and an apparatus for desalinating water of a water supply that is inexpensive to achieve and manage.

Another object of the present invention is to provide a method and an apparatus for treating a fluid containing ionized particles that are entirely safe and reliable in operation.

Another object of the present invention is to provide an apparatus for treating a fluid containing ionized particles which requires an extremely limited maintenance.

BRIEF DESCRIPTION OF THE DRAWINGS

The technical characteristics of the finding, according to the aforesaid objects, are clearly seen in the contents of the below-reported claims and the advantages thereof will be clearer in the following detailed description made with reference to the enclosed drawings, which represent several merely exemplifying and non-limiting embodiments of the invention, in which:

DETAILED DESCRIPTION OF A PREFERRED EMBODIMENT

With reference to the set of drawings, the apparatus for treating a fluid containing ionized particles, object of the present invention, has been indicated in its entirety with 1.

The apparatus 1 and the method, according to the invention, are adapted to be employed in the domestic setting inside homes, as well as in bars or artisanal shops in order to soften the water of the water supply, allowing an optimal use thereof in all possible applications thereof.

For such scope, with the term "hardness level", it is substantially intended to indicate a value that expresses the content of ions, mainly calcium and magnesium, due to the presence of their soluble salts dissolved in the water.

The apparatus 1 and the method, object of the present invention, can therefore be usefully employed to reduce the water level hardness as well as to eliminate or considerably reduce many other substances such as nitrates, chlorides, sulphates and ammonia.

The apparatus 1 and the method, according to the invention, are more generally adapted to be employed for the purification of fluids, removing ionized particles present therein which are susceptible of being affected by the presence of an electric field, such as for example ions in solution.

In particular, the present apparatus and the method are adapted to be employed for desalinating seawater, even in settings where there is low electrical energy supply.

Hereinbelow, the term 'ionized particles' will generically indicated any one contaminant dissolved in the fluid to be treated capable of being attracted by an electrostatic field, like in particular the ions dissolved in a fluid or the salts in seawater.

The apparatus is therefore adapted to operate in many different fields, and in particular in a domestic setting such as a simple softener to reduce the hardness level of the water, or more generally for the deionization of water; the apparatus is also adapted for use in an industrial setting for the deionization of industrial process waste fluids, given that it is in particular capable of removing the following from the fluid: salts in solution (such as chlorides and sulfides), nitrates, nitrites, ammonia, and other polarized contaminants, of chemical substances, organic substances or micropollutants in general; finally, the apparatus is also adapted to desalinating seawater.

The apparatus is further adapted for concentrating, within limited volumes, ionized particles particularly of industrial processes, in order to facilitate the recovery or the disposal thereof.

Figure 1:
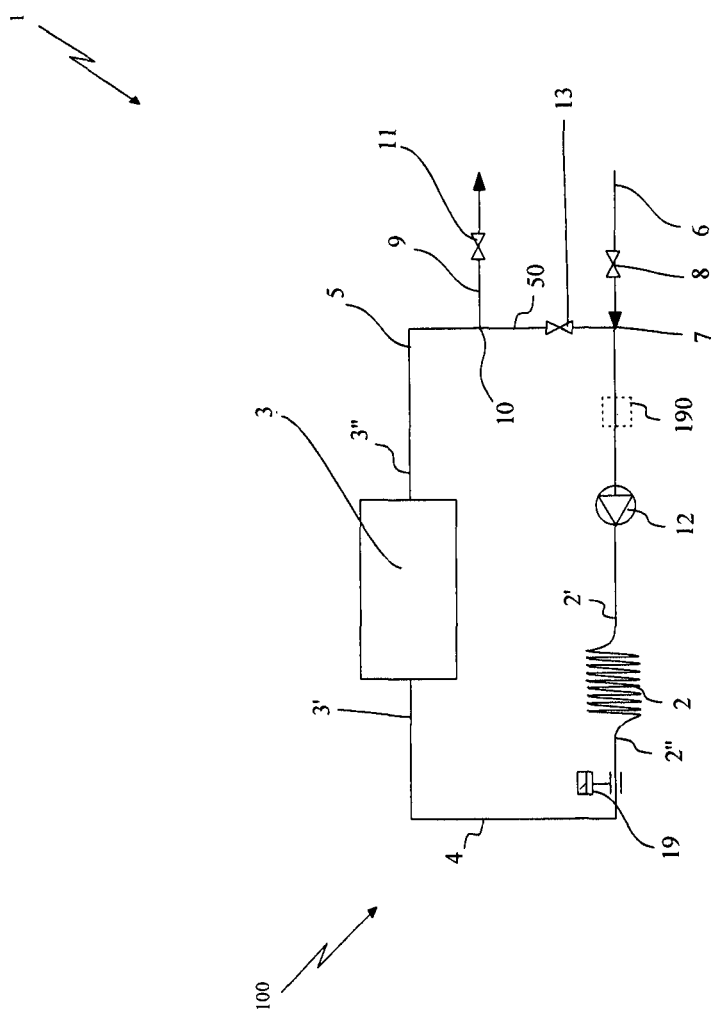
FIG. 1 shows a first functioning scheme relative to a first embodiment of the apparatus for treating a fluid containing ionized particles according to the present invention.

In accordance with the embodiment of FIG. 1, the apparatus, object of the present invention, comprises at least one immiscible storage tank 2, e.g. advantageously obtained with a roll tube coil having section with diameter preferably comprised between 5 and 30 mm.

The immiscible storage tank will be advantageously obtained by configuring a path of the fluid at its interior that is capable of conferring a substantially laminar condition to the fluid, so as to prevent it from being mixed.

Such immiscible tank 2 is susceptible of containing at least one fluid reserve with variable concentration of ionized particles, since the fluid that enters into the tank flows along its extension without being mixed, maintaining substantially unchanged the concentration gradient present in the entering fluid.

Of course, without departing from the protective scope of the present patent, the immiscible tank 2 can be differently obtained also in another manner with respect to that of the roll tube mentioned above as an example; for example, it can be obtained by means of a containment chamber divided by means of a plurality of elements, such as separators or spherules, into a multiplicity of wells or channels capable of making the water flow with substantially laminar condition, dividing it in an immiscible manner. Such immiscible tank 2 is provided with a first inlet connection 2' and with a first outlet connection 2".

The apparatus 1 also comprises at least one filtering unit 3, which is advantageously of cyclically regenerable type, and is connected to the immiscible storage tank 2 by means of a hydraulic circuit 100. More in detail, the filtering unit 3 is provided with a second inlet connection 3' and with a second outlet connection 3" respectively hydraulically connected to the first outlet connection 2" and to the first inlet connection 2' of the immiscible storage tank 2 by means of a delivery pipe 4 and a return pipe 5 of the hydraulic circuit 100.

The filtering unit 3 can be obtained with any one known apparatus for the purification and in particular the desalination of water, such as a reverse osmosis membrane filter, a flow-through capacitor, an active carbon filter, an ion exchange resin filter, an electrodialysis apparatus or other filtering apparatuses of known type.

The filtering unit 3 is preferably cyclically switched by the logic control unit between an operating condition C, in which it is traversed by a contaminated fluid which it receives from the immiscible tank 2, and a regeneration condition D, in which it is subjected to a cleaning step for restoring its filtering action and it is not traversed by the contaminated fluid to be treated.

Advantageously, the filtering unit 3 will be obtained with a flow-through capacitor as will be clearly detailed hereinbelow.

It is then provided with a supply pipe 6 connected by means of an introduction section 7 to the hydraulic circuit 100 and preferably to the return pipe 5 of the hydraulic circuit 100 of the apparatus 1, and intercepted by at least one first valve 8, susceptible of allowing, or not allowing, a flow of the fluid to be purified to be introduced into the hydraulic circuit 100.

An extraction pipe 9 for conveying the purified fluid to the user is connected by means of a drawing section 10 to the hydraulic circuit 100. It is advantageously connected to the return pipe 5 of the hydraulic circuit 100 upstream of the introduction section 7, and it is intercepted by at least one second valve 11.

The second valve 11 for intercepting the extraction pipe 9 can of course be constituted by a tap, being intended with the latter expression any one member for intercepting the extraction pipe 9 that can selectively control a request for filtered water flow towards any one user, whether an apparatus, a sink or even an accumulation tank.

Circulation means 12 are also provided, for example constituted by a pump, which can be activated to force the circulation of the fluid present in the hydraulic circuit 100 between the immiscible tank 2 and the filtering unit 3.

As will be better clarified hereinbelow, the aforesaid circulation means 12 can advantageously have small power and dimensions, given that they are responsible not for sending the purified fluid directly to the user but only to recirculate it in the hydraulic circuit 100.

In accordance with the above-described hydraulic configuration, a third valve 13 is provided for intercepting the hydraulic circuit 100 upstream of the introduction section 7 and downstream of the drawing section 10. It is preferably arranged, in accordance with the above-illustrated embodiment, to intercept the return pipe 5 arranged downstream of the drawing section 10 of the extraction pipe 9 and upstream of the introduction section 7 of the supply pipe 6.

Through the second valve 11 and the third valve 13, the fluid coming from the filtering unit 3 can therefore be directed to the user through the extraction pipe 9 by opening the relative second valve 11 and closing the third valve 13, i.e. it can be directed to the immiscible tank 2 by opening the relative third valve 13 and closing the second valve 11. Of course, without departing from the protective scope of the present patent, the two valves 11 and 13 can be constituted by a multi-valve group, or by a multi-way valve, or by other configurations of valves capable of making the fluid as described above selectively flow into the extraction pipe 9, into the supply pipe 6 and into the hydraulic circuit 100.

The apparatus 1 is also provided with a logic control unit (not illustrated) connected to the valves and to the circulation means 12 in order to control the apparatus 1 according to preset operating conditions which provide for the cyclic repetition of at least one circulation condition A and one production condition B.

More in detail, in the circulation condition A the control unit controls the first 8 and the second valve 11 to close, the third valve 13 to open and the circulation means 12 in activated position so as to determine the circulation of the fluid through the filtering unit 3 and the immiscible tank 2 as well as the accumulation in the latter of an operating amount of fluid with increasing concentration of ionized particles. In other words, it must be intended that in at least one zone of the tank 2, an operating amount of fluid is present whose concentration increases in the direction from the first outlet section 2" to the first inlet section 2'. The fluid flowing through the filtering unit 3 is purified of the ionized particles to an increasingly smaller extent due to the progressive exhaustion of the pick-up capacities of the same filtering unit 3. Consequently, through the circulation of the fluid in the hydraulic circuit 100, a fluid reaches and is accumulated at the immiscible tank 2, such fluid having increasing concentration of ionized particles.

In the aforesaid production condition B, the control unit controls the first 8 and the second valve 11 to open, and the third valve 13 to close and deactivates the circulation means 12 so as to cause the introduction—in the hydraulic circuit 100 through the supply pipe 6—of a same operating amount of previously considered fluid that is still to be purified and consequently forcing the corresponding operating amount of fluid with increasing concentration of ionized particles contained in the immiscible tank 2 to exit from the same immiscible tank 2 and then be extracted by the extraction pipe 9.

Preferably, in accordance with the preferred embodiment of the invention i.e. with the above-indicated configuration of the hydraulic circuit having the extraction pipe 9 and the supply pipe 6 connected in sequence to the return pipe 5, the control unit controls in the aforesaid production condition B, forces the operating amount of fluid with increasing concentration of ionized particles contained in the immiscible tank 2 to exit from the same immiscible tank 2 and then to be extracted from the extraction pipe 9 by first passing through the filtering unit 3.

Otherwise, in accordance with a non-illustrated embodiment, the extraction pipe 9 could for example draw the operating amount of fluid with increasing concentration of ionized particles contained in the immiscible tank 2 directly at the outlet thereof or from the delivery pipe 4, in this case providing for suitable valves on such delivery pipe 4 rather than on the return pipe 5.

Advantageously, the aforesaid operating amount of fluid which is extracted in the aforesaid production condition B is at least one portion of the amount of fluid treated by the filtering unit 3 while the apparatus was in circulation condition and the filtering unit 3 was in operating condition C and was activated on the fluid that moved through it in order to clean it of ionized particles.

During the production condition B, the fluid present in the tank 2 with increasing concentration of ionized particles flows into the filtering unit 3 first with the fluid with lower concentration of ionized particles and progressively with always greater particle concentration.

The filtering unit 3 then treats the operating amount of fluid that first moves through it and that contains, as said, a smaller concentration of ionized particles so as to further reduce such amount and direct it to the user (i.e. to an accumulation tank as explained hereinbelow) through the extraction pipe 9. After having treated such operating amount of fluid, the logic control unit controls the switching from the production condition B to the circulation condition A. In this manner, only the best quality part of the fluid, i.e. with lower particle concentration, is sent to the user. In the subsequent circulation condition A, the end of the fluid treated in the operating cycle C by the filtering unit 3 is accumulated in the immiscible tank 2. Such amount treated in the circulation condition A can be different and in particular higher than the aforesaid operating amount of the production condition B. Such amount, although not sufficiently purified for the user is in any case at least partially purified to an extent that is progressively worsened, i.e. with increasing concentration of ionized particles. The circulation of the fluid in the hydraulic circuit 100 can continue, as better specified hereinbelow, for a pre-established time period, for example corresponding with the advancement of a pre-established amount of fluid (or of a multiple of the aforesaid amount) adapted to bring to the end of the tank the first fluid treated by the filtering unit in the circulation step. Analogously, the circulation of the fluid in the hydraulic circuit 100 can continue up to the detection of a pre-established amount of fluid corresponding to the aforesaid amount adapted to bring to the end of the tank the first fluid treated by the filtering unit in the circulation step. In a preferred manner, as explained hereinbelow, the circulation of the fluid in the hydraulic circuit 100 can continue up to the detection by a conductivity meter of a drop of conductivity indicative of the arrival of the first fluid treated by the filtering unit 3 and not directed from the production condition B to the extraction pipe 9.

Preferably, the passage from the circulation condition A to the production condition B of the apparatus 1 does not occur directly like the reverse passage but through the interposition of a regeneration condition D of the filtering unit 3, in which the latter is subjected to a cleaning step for restoring its filtering action before the apparatus can pass to the production condition B.

The operating amount is thus the amount of fluid that enters and exits at each cycle of production condition B.

It can be determined with different means as is described hereinbelow.

The aforesaid production B and circulation A conditions of the apparatus 1 summed together define the operating condition C of the filtering unit 3 of the same apparatus 1 i.e. the condition in which the fluid is treated by the filtering unit 3.

As mentioned above, a regeneration condition D of the filtering unit 3 is also provided which is alternated with its operating condition C and in which the filtering unit 3 is subjected to a cleaning step for restoring its filtering action and is not traversed by the contaminated fluid to be treated.

Such regeneration condition D can be actuated in various ways according to the type of filtering unit 3 employed. Generally it can provide for a washing of the filtering unit 3. In the case of a filtering unit 3, such alternation of operating C and regeneration D conditions involves an intermittent functioning of the apparatus given that while the filtering unit 3 is washed, it of course cannot function for treating another contaminated liquid.

Hereinbelow, one embodiment of the present invention is described that makes use of two filtering units 3A, 3B for optimizing the yield of the apparatus 1.

Hereinbelow, the aforesaid circulation A and production B conditions of the apparatus 1 will for the sake of simplicity refer to the filtering units 3A, 3B; nevertheless, it is intended that they also regard the condition of the common tank 2.

In accordance with such embodiment, illustrated in particular in FIGS. 2-12 are second inlet connections 3' of the two filtering units 3A and 3B, which are connected to the first outlet connection 2" of the immiscible tank 2 by means of respective delivery pipes 4A, 4B each intercepted by a fourth valve 14A, 14B and connected to a common initial section 40 of the delivery pipe 4. The second outlet connections 3" of the two filtering units 3A and 3B are connected to the first inlet connection 2' of the immiscible tank 2 by means of respective return pipes 5A, 5B each intercepted by a fifth valve 15A, 15B and having a' common terminal section 50 of the return pipe 5, connected to the first inlet connection 2' and intercepted by the third valve 13 arranged downstream of the drawing section 11 and upstream of the introduction section 7.

In accordance with the preferred solution of the present invention each filtering unit 3A and 3B is a device with flow-through capacitors. Each aforesaid device with flow-through capacitors 3A and 3B is provided, in a per se conventional manner, with one or more cells 30, each having counterfaced electrodes between which the flow of fluid to be treated containing ionized particles is susceptible of flowing.

Each filtering unit 3A and 3B, and in particular each device with flow-through capacitors 3A and 3B, operates cyclically in a substantially staggered manner with respect to the other device 3B and 3A between the aforesaid operating condition C, in which it purifies the flow that traverses it, and regeneration condition D, in which it does not treat the fluid to be purified and the ionized particles accumulated therein are removed.

In the enclosed figures, representative of the different conditions and steps in which the apparatus 1 is situated and works and which refer to the particular embodiment in which the filtering units 3A and 3B are obtained with a device with flow-through capacitors, the circuits traveled by the fluid were indicated with thicker lines.

Each flow-through capacitor 3A and 3B comprises, in a per se entirely conventional manner, a plurality of electrodes organized in cells 30 electrically connected, by means of suitable manifolds, to a DC direct current power supply. The latter charges the contiguous electrodes to different polarities in a manner so as to define a plurality of pairs of counterfaced electrodes which form the armatures of the same number of capacitors in series, between which electric fields are initiated.

The electrodes are obtained with superimposed and counterfaced layers of conductor material, separated from each other by separator layers within which the water flows that is to be treated, such water containing the ions that one wishes to at least partly remove. The conductor layers that form the electrodes are made of a conductor material with porous structure, i.e. with a formation of surface pores that offer a considerable exchange surface with the liquid, such as spongy active carbon. In accordance with a preferred embodiment of the present invention, the electrodes comprise a layer of semipermeable material, which can be associated in a various manner with the layer of conductor material.

The separator layers can in turn be constituted by highly porous, non-conductive materials, capable of isolating the electrodes, allowing the passage of the flow of the fluid, such as a porous synthetic material or other non-conductive spacer materials such as glass fiber or a nylon fabric.

The cells 30 are thus cyclically affected by the passage of flow of the fluid to be treated and washing fluid, in accordance with the operating modes well known to the man skilled in the art and better specified hereinbelow.

The flow-through capacitor 3A and 3B is power supplied by the direct current power supply through an integrated circuit control board of the logic control unit of the apparatus; such board controls, in the different operating steps of the functioning cycle of the capacitor, typically by means of semiconductor switches, the voltage applied to the electrodes by means of suitable connection manifolds.

Such functioning cycle can for example provide for, in a manner per se entirely conventional and well known to the man skilled in the art: an operating condition C, in which initially the power supply charges the contiguous electrodes with different polarity in order to bring them to a constant operating voltage, for example equal to 1.6 V; subsequently, then, with the electrodes charged, the power supply forces, by driving the circulation means 12, the flow of fluid to be treated to pass through the capacitor 3A and 3B.

During the operating condition C, there is the cleaning of the fluid of the ions, in particular calcium and magnesium in the case of water, due to the fact that the latter are attracted by the electrode with opposite polarity; on such electrode, the ions are progressively accumulated.

Once the programmed saturation has been reached of the electrodes with the ions present in the fluid, a regeneration condition D is provided in which advantageously at least one washing condition D1 is provided with the electrodes deactivated. In such washing condition D1, a flow of washing fluid is forced to pass into capacitor 3A and 3B with ensuing removal of the ions accumulated on the electrodes in the preceding operating step C, and then the flow is directed into the discharge pipe as specified below.

With the term "deactivated", employed above in reference to the electrodes, it must be intended all those possible voltage conditions present at the electrodes in the regeneration step such as: the condition of short-circuited electrodes, the condition of electrodes charged with reversed polarity, the condition of electrodes not connected to the power supply.

All the aforesaid charge and discharge steps are managed by the board of the power supply in a per se known manner.

In order to allow the actuation of the aforesaid regeneration condition D, which as stated and described hereinbelow, provides for at least one washing condition D1 for the cells 30, it is necessary to provide for the movement of a washing flow from the supply to a discharge of the device with flow-through capacitors 3A and 3B.

For such purpose, the supply pipe 6 is provided with a first branch 60 intercepted by the first valve 8 and connected to the common section 50 of the return pipes 5A, 5B downstream of the third valve 13, and with a second and third branch respectively indicated with 60A and 60B, each of which respectively connected to a corresponding delivery pipe 4A, 4B of the two devices with flow-through capacitors 3A and 3B upstream (with respect to the advancement of the flow in the supply pipe 6) of the corresponding relative fourth valve 14A and 14B, and is in turn intercepted by a corresponding sixth valve respectively indicated with 16A and 16B with reference to the two devices 3A, 3B.

The hydraulic circuit 100 also comprises two discharge pipes 17A, 17B, each of which connected to one of the return pipes 5A, 5B of the two devices with flow-through capacitors 3A, 3B upstream of the corresponding fifth valve 15A, 15B, and is in turn intercepted by a corresponding seventh valve respectively indicated with 18A and 18B with reference to the two devices 3A, 3B.

In accordance with the aforesaid configuration of the hydraulic circuit 100, the logic control unit defines the washing condition D1 of the regeneration D of each device with flow-through capacitors 3A, 3B through the opening of the sixth valve 16A, 16B and the seventh valve 18A, 18B of such device 3A, 3B, to flow through the relative cells 30 a flow of washing fluid adapted to determine the removal of the ionized particles accumulated on the relative electrodes towards the discharge pipe 17A, 17B. The flow that passes into the discharge pipe 17A, 17B must be considered waste and it is therefore sent to the normal discharge provided by the water supply. Of course, if the object of the apparatus is instead to concentrate a fluid, for example in the case of treatment of industrial fluids, such removal of the particles is not waste but is instead the desired fluid.

Figure 7:
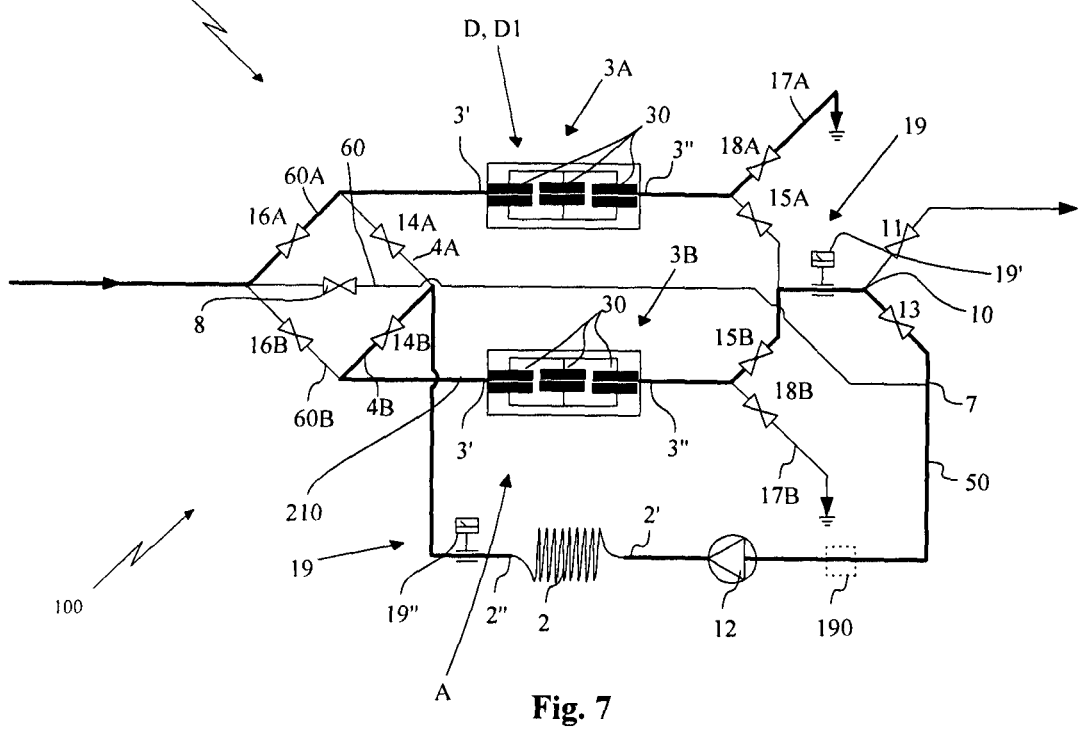
FIG. 7 shows the apparatus, object of the present invention, with the first flow-through capacitor in a regeneration step with passage of washing fluid according to the method that is the object of the present invention.
Figures 11, 12:
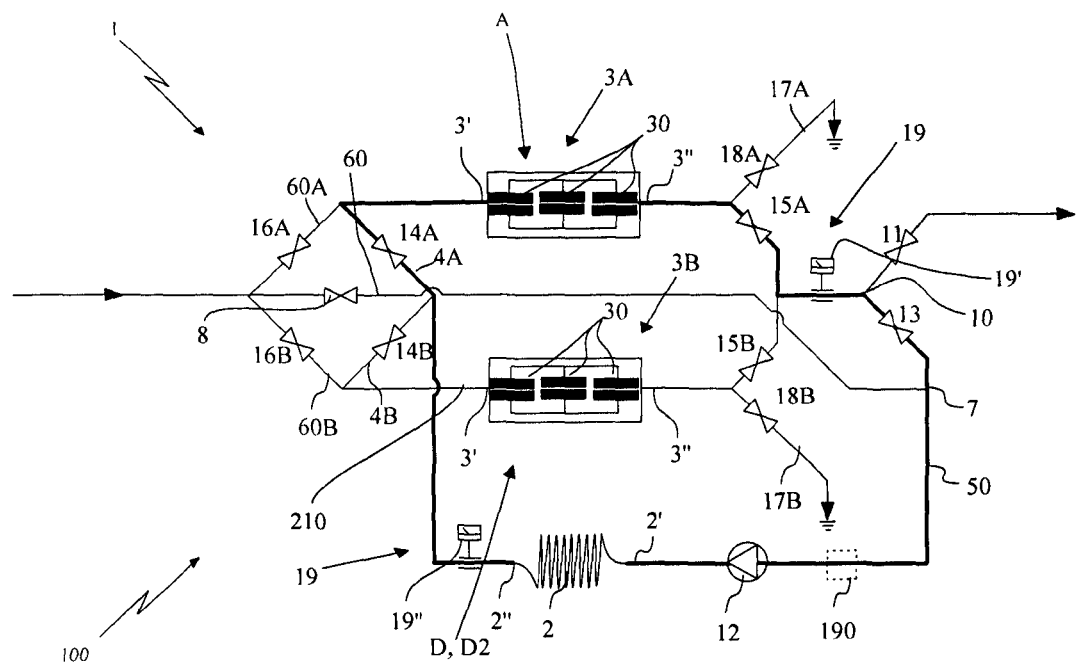
FIG. 11 shows the apparatus, object of the present invention, with the second flow-through capacitor in a regeneration step without passage of washing fluid according to the method that is the object of the present invention.
FIG. 12 shows the apparatus, object of the present invention, with the second flow-through capacitor in a regeneration step with passage of washing fluid according to the method that is the object of the present invention.

At the same time, while the aforesaid device 3A, 3B is in regeneration condition D and in particular washing condition D1, the logic control unit controls the other device 3B and 3A in circulation condition A as can be appreciated from the attached FIGS. 7 and 12 relative to the two devices 3B and 3A in circulation condition A.

The regeneration condition D of each said device with flow-through capacitors 3A, 3B, in addition to comprising the aforesaid washing condition D1, also comprises diffusion conditions D2 in which said logic control unit first controls the short-circuit of the electrodes and then the reversal of polarity of the electrodes of the cells. In such diffusion conditions D2, the cells are not traversed by a washing fluid and the logic control unit simultaneously controls the other device with flow-through capacitors 3B and 3A to be arranged in the production condition B (see FIGS. 4, 9).

The circulation condition A of each device with flow-through capacitors 3A, 3B (see respective FIGS. 5-7, 10-12) is defined by the logic control unit by means of:
  interruption of the supply pipe 6, in particular by closing the first valve 8;
  opening of the third valve 13;
  opening of the fourth valve 14A, 14B and fifth valve 15A, 15B of the delivery 4A, 4B and return 5A, 5B pipes connected to the corresponding device with flow-through capacitors 3A, 3B that one wishes to arrange in circulation condition A;
  closing the fourth valve 14A, 14B and fifth valve 15A, 15B of the delivery 4A, 4B and return 5A, 5B pipes connected to the other device with flow-through capacitors 3B, 3A advantageously in regeneration condition D;
  closing the sixth valves 16A, 16B;
  closing the seventh valve 18A or 18B associated with the device with flow-through capacitors 3A, 3B that one wishes to arrange in circulation condition A.

In turn, the production condition B of each device with flow-through capacitors 3A, 3B (see respective FIGS. 4, 9) is defined by the logic control unit by means of:
  opening the first valve 8 and the second valve 11 respectively of the supply pipe 6 and the extraction pipe 9;
  opening the fourth valve 14A or 14B and fifth valve 15A or 15B of the delivery 4A, 4B and return 5A, 5B pipes connected to the corresponding device with flow-through capacitors 3A, 3B that one wishes to arrange in production condition B;
  closing the fourth valve 14A, 14B and fifth valve 15A, 15B of the delivery 4A, 4B and return 5A, 5B pipes connected to the other device with flow-through capacitors 3B, 3A advantageously in regeneration condition D;
  closing the sixth valves 16A and 16B;
  closing the seventh valve 18A or 18B associated with the device with flow-through capacitors 3A, 3B that one wishes to arrange in production condition B.

The passage from the production condition B to the circulation condition A and hence of the operating amount of fluid that is sent to the user and which must be restored with new fluid coming from the supply pipe 6, can be defined by means of a timer associated with the logic control unit but preferably it will be defined due to the reading of a characteristic of the fluid detected by diagnostic means 19 associated with at least one section of the hydraulic circuit 100. The logic control unit determines the passage of the filtering unit, and in particular of the device with flow-through capacitors 3A, 3B, from the circulation step to the production step and from the production step to the circulation step upon exceeding the threshold values detected by the aforesaid diagnostic means 19. The latter comprise, for example, a detector of the amount of fluid 190 (indicated with dashed line in the figures), which determines the aforesaid switching upon the reoccurrence of the passage of predefined amounts of fluid.

As in the case of the control of the switching between the two operative conditions A and B by means of a timer associated with the logic control unit, it is not possible in this manner to adapt the functioning of the apparatus upon varying the quality conditions (salinity conditions) of the fluid entering the supply pipe 6.

Therefore, for such purpose, the diagnostic means 19 preferably comprise a first conductivity meter 19' arranged at the outlet of the two devices with flow-through capacitors 3A, 3B in the common terminal section 50 of the return pipes 5A, 5B. Such first conductivity meter 19' is connected to the logic control unit such that the latter, upon receiving a preset threshold value of maximum conductivity detected by the aforesaid first conductivity meter 19', controls the passage of the device with flow-through capacitors 3A, 3B, which is situated in operating condition C, from the production condition B to the circulation condition A. More clearly, when the fluid, for example the water intended for the user, no longer meets the desired quality characteristics set through the first conductivity meter 19', the logic control unit stops serving the user and switches the configuration of the hydraulic circuit 100 as specified above from the production condition B to the recirculation condition A, maintaining the device with capacitors 3A, 3B still in operation even if no longer for serving the user but rather only for exploiting the residual capture capacity of the device 3A, 3B. Hence, at least one operating amount of fluid is created with increasing concentration of ionized particles, which will then be treated in the subsequent production step (in particular by the other device—or even by the same device if the tank comprises a multiple of such amount) in order to newly create a sufficiently purified fluid, i.e. one which satisfies the setting of the conductivity meter and hence the needs of the user.

Upon varying the conditions of the entering fluid, the production step will be extended for a greater or lesser time, and consequently a greater or lesser operating amount of purified fluid will be sent to the user through the extraction pipe 9. In an equivalent manner, a greater or lesser operating amount of new fluid to be treated will enter from the supply pipe 6.

The diagnostic means 19 also preferably comprise a second conductivity meter 19" arranged at the outlet of the immiscible tank 2 on the common initial section 40 of the delivery pipes 14A, 14B.

Such second conductivity meter 19" is connected to the logic control unit such that when the latter receives a preset threshold value of minimum conductivity detected by the aforesaid second conductivity meter 19", it controls the passage of the device with flow-through capacitors 3A, 3B, which was in operating condition C, into the regeneration condition D, and controls the other device with flow-through capacitors 3B and 3A, which had terminated the regeneration condition D to pass into the production condition B.

Such second conductivity meter 19" is connected to the logic control unit such that when the latter receives a preset threshold value of minimum conductivity detected by the aforesaid second conductivity meter 19", it controls the passage of the device with flow-through capacitors 3A, 3B, which is in circulation condition A, into the regeneration condition D and controls the other device with flow-through capacitors 3B, 3A which was in regeneration condition D into the production condition B.

The second conductivity meter 19" detects the arrival of the conductivity drop of the fluid due to the preceding switching from the production condition B to the recirculation condition A. Such fluid front with low salinity corresponds with the first fluid discarded immediately after the switching in recirculation A and it is susceptible of being easily purified in the subsequent production condition B by the new flow-through capacitor 3A, 3B in order to obtain highly-purified fluid to send to the user.

The second conductivity meter 19" therefore detects, through a minimum conductivity measurement, the previous switching from the production step B to the circulation step A and is therefore capable of automatically varying the duration of the circulation step A and the start of the new production step B, adapting to the variation of the flow amount that has entered and exited in the previous production condition B.

Preferably, before restarting the operating step of each flow-through capacitor 3A, 3B, a pre-production condition E also takes place, in which the flow of fluid to be treated in the operating step is conveyed to the discharge pipe 17A, 17B before the cells 30 of the capacitor 3A, 3B reach the charge of the provided voltage, before the electrodes are completely efficient for their action of cleaning the liquid of the ionized particles as well as for the purpose of cleaning the cells with liquid substantially purified by the washing liquid of the previous regeneration step D.

Figure 3:
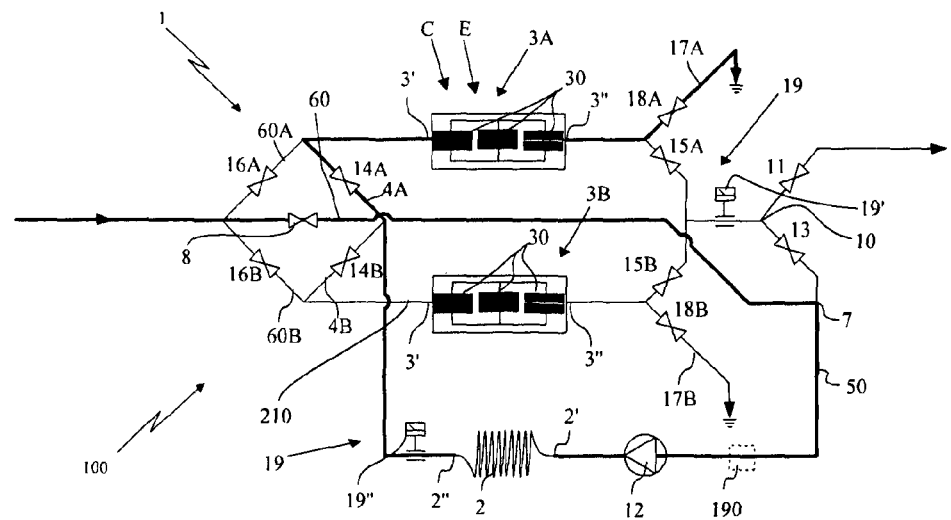
FIG. 3 shows the apparatus, object of the present invention, with a first flow-through capacitor in a pre-production step according to the method that is the object of the present invention.
Figure 4:
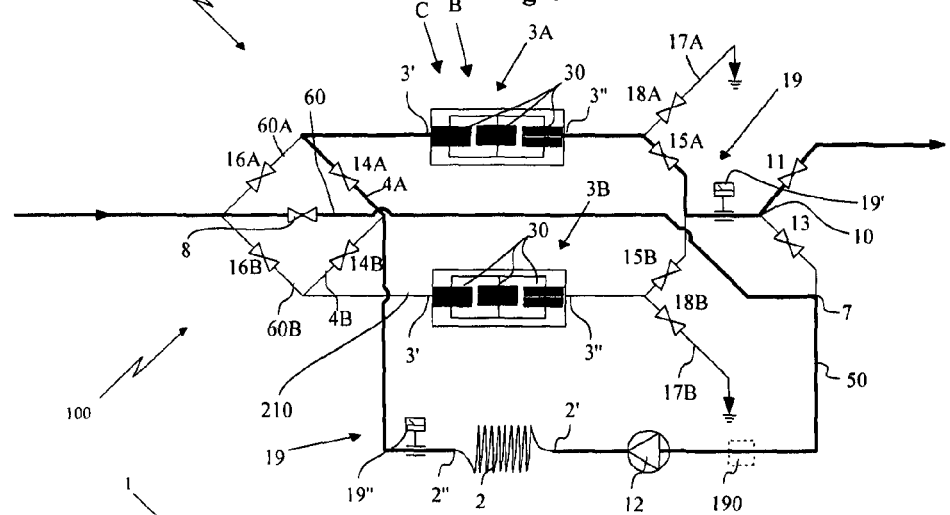
FIG. 4 shows the apparatus, object of the present invention, with the first flow-through capacitor in a production step according to the method that is the object of the present invention.
Figure 5:
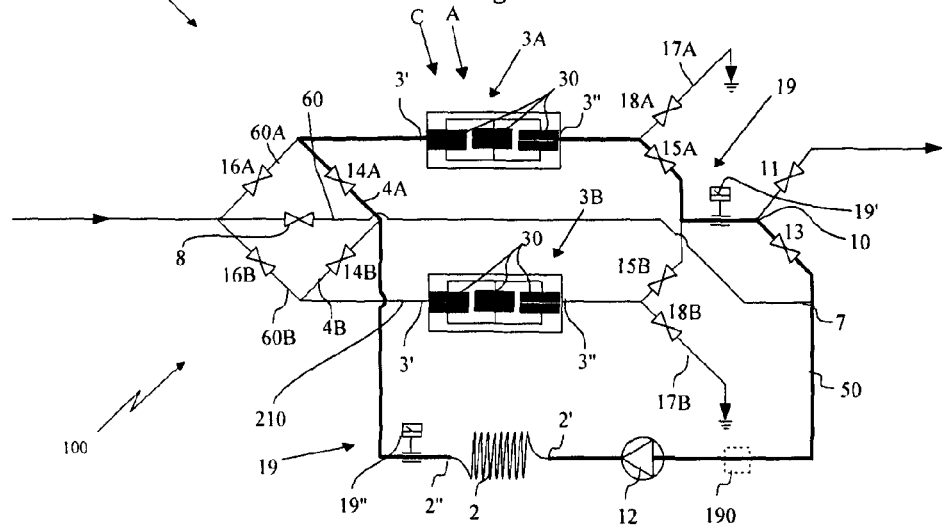
FIG. 5 shows the apparatus, object of the present invention, with the first flow-through capacitor in a circulation step according to the method that is the object of the present invention.
Figure 6:
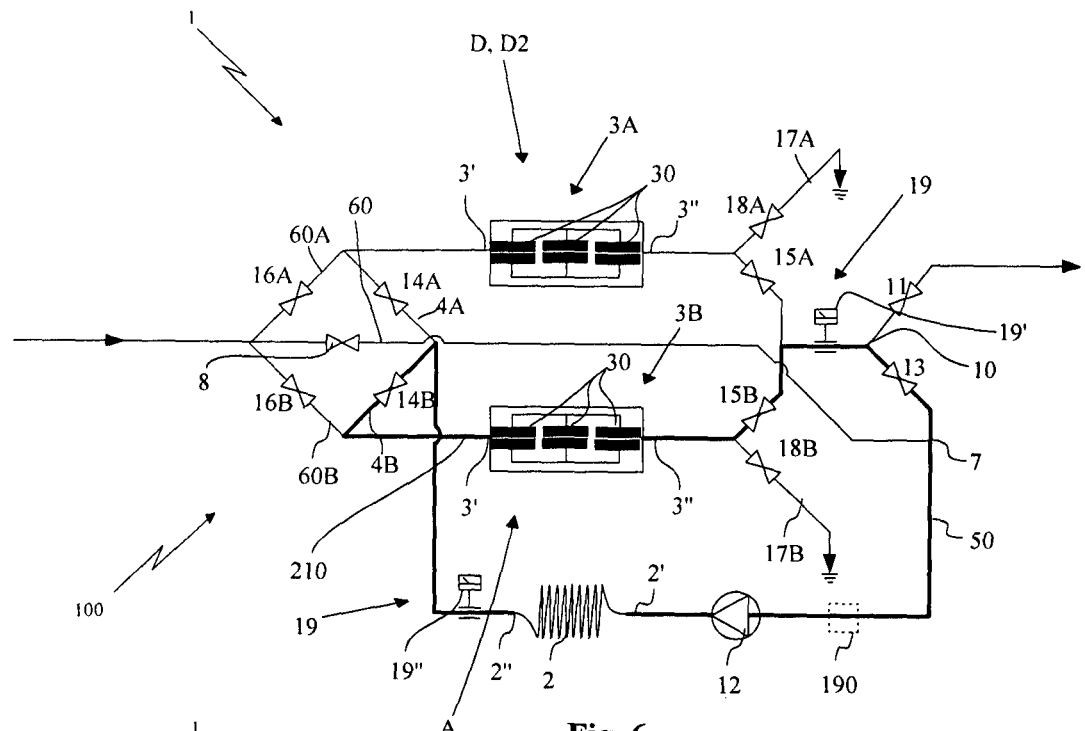
FIG. 6 shows the apparatus, object of the present invention, with the first flow-through capacitor in a regeneration step without passage of washing fluid according to the method that is the object of the present invention.
Figure 8:
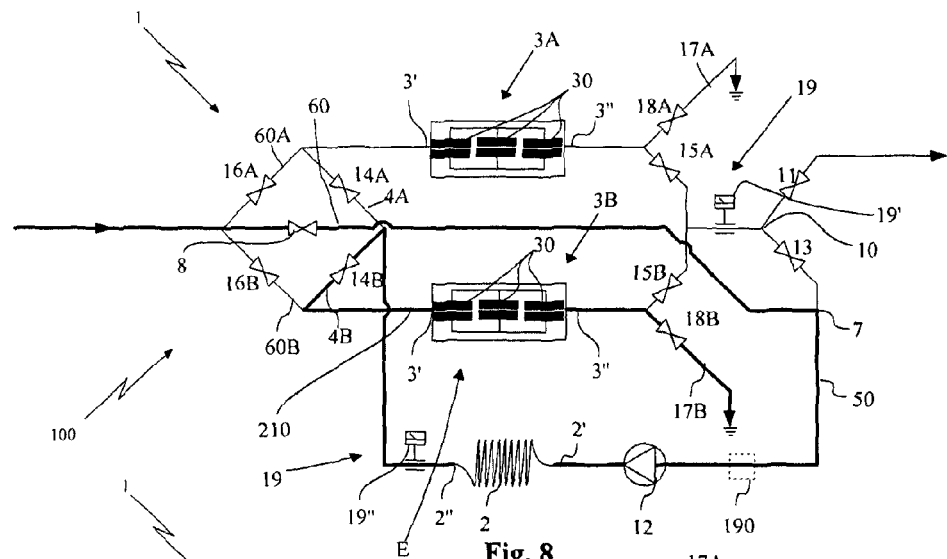
FIG. 8 shows the apparatus, object of the present invention, with a second flow-through capacitor in a pre-production step according to the method that is the object of the present invention.
Figure 9:
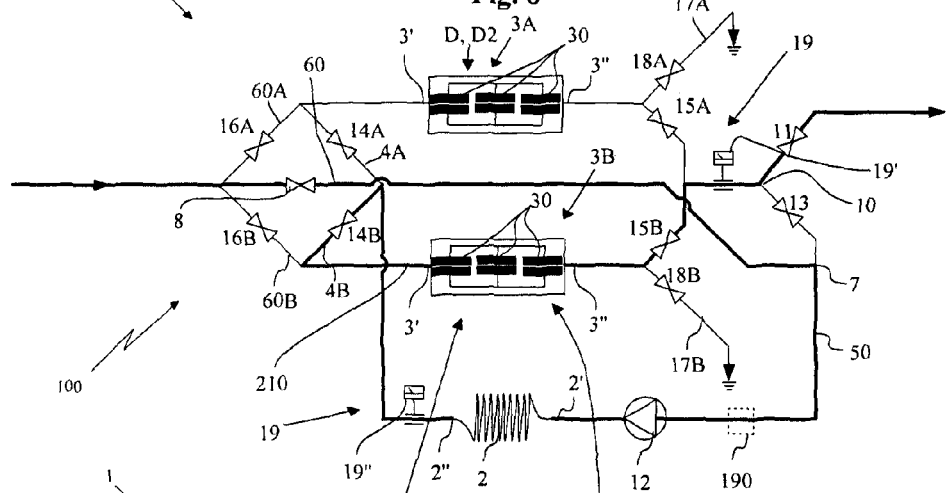
FIG. 9 shows the apparatus, object of the present invention, with the second flow-through capacitor in a production step according to the method that is the object of the present invention.
Figure 10:
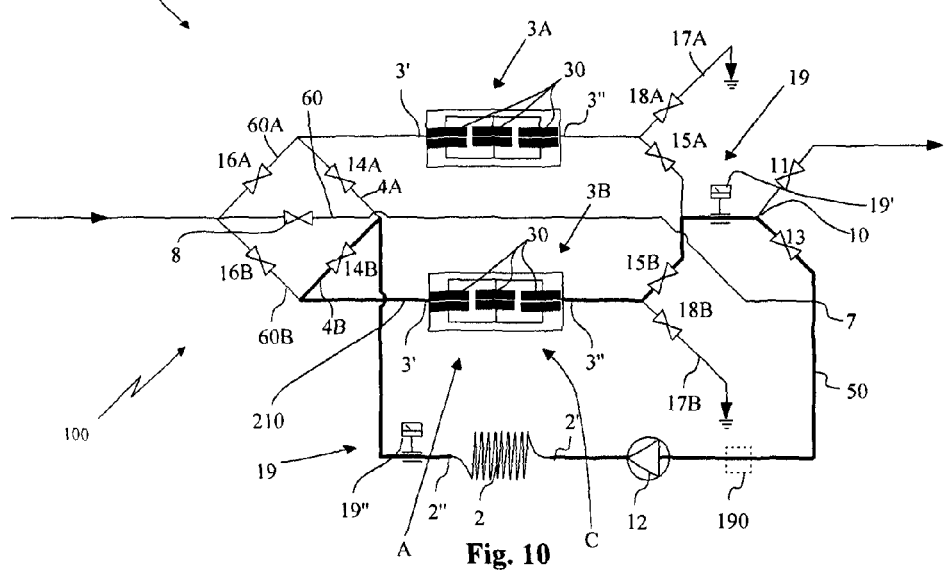
FIG. 10 shows the apparatus, object of the present invention, with the second flow-through capacitor in a circulation step according to the method that is the object of the present invention.

Such pre-production condition E is illustrated in FIGS. 3 and 8 with reference to the two different capacitors 3A, 3B.

The pre-production condition E of each device with flow-through capacitors 3A, 3B (see respective FIGS. 3, 8) is defined by the logic control unit by means of:
  opening the first valve 8 of the supply pipe 6;
  opening the fourth valve 14A or 14B of the delivery pipe 4A, 4B connected to the corresponding device with flow-through capacitors 3A, 3B which one wishes to arrange in pre-production condition E, the other 14A or 14B being closed;
  closing the fifth valve 15A or 15B of the return pipes 5A, 5B connected to the corresponding device with flow-through capacitors 3A, 3B that one wishes to arrange in pre-production condition E;
  closing the sixth valve 16A, 16B;
  opening the seventh valve 18A or 18B associated with the device with flow-through capacitors 3A, 3B that one wishes to arrange in pre-production condition E.

The passage from the pre-production condition E to the production condition B is actuated through the logic control unit by closing the corresponding seventh valve 18A or 18B and opening the corresponding fifth valve 15A or 15B as well as opening the second valve 11 of the extraction pipe 9.

Of course, without departing from the protective scope of the present patent, some of the above-indicated valves converging in a common node of the circuit 100 can be constituted by multi-valve groups or by multi-way valves.

Figure 2:
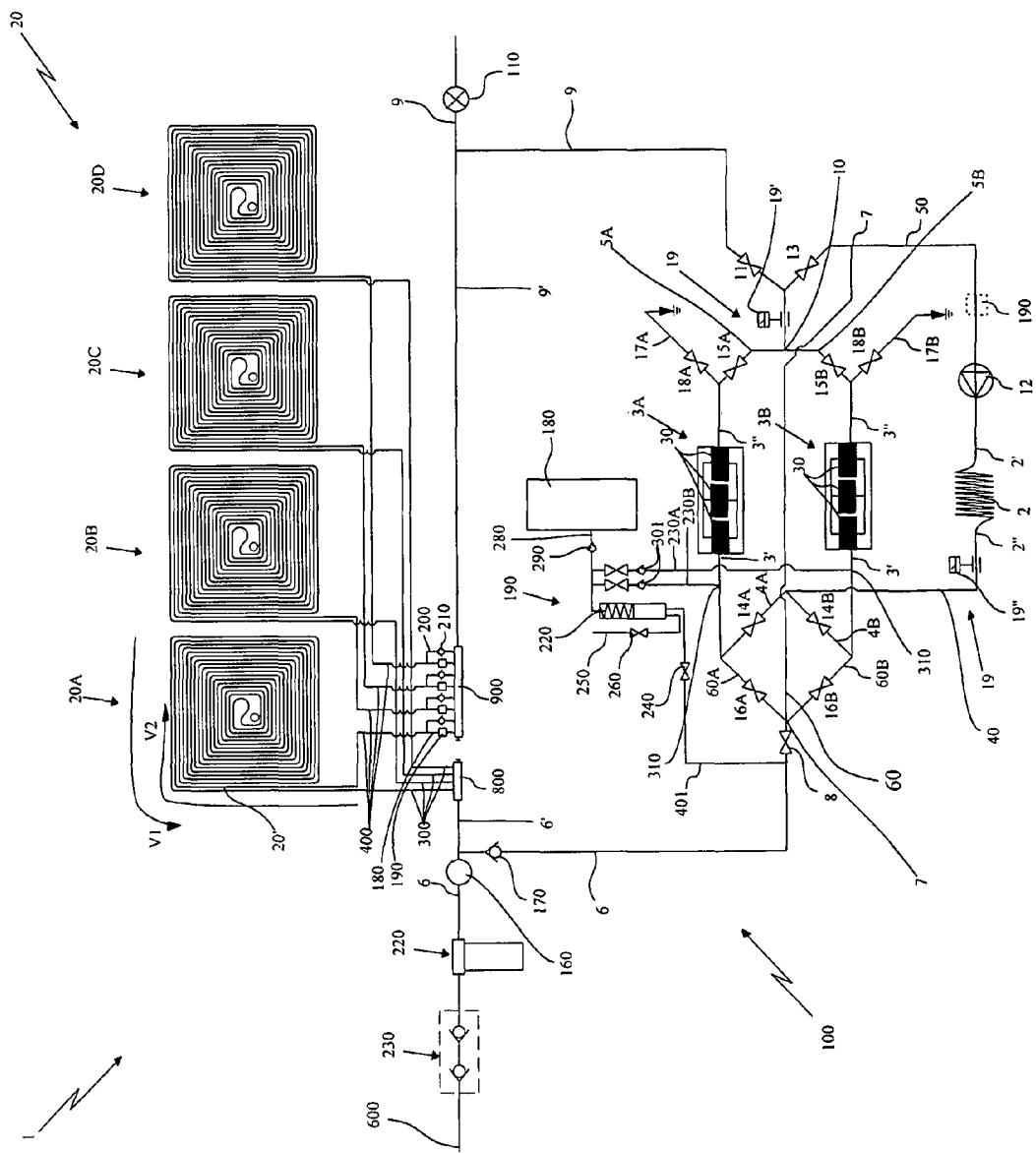
FIG. 2 shows a second functioning scheme relative to a second embodiment of the apparatus for treating a fluid containing ionized particles according to the present invention, and in particular for treating the water of a water supply system with two flow-through capacitors, associated with a device for the periodic cleaning of the capacitors and a tank for accumulating the treated water.

In accordance with an advantageous embodiment of the present invention illustrated in FIG. 2, the apparatus 1 also comprises one or more tanks 20 for accumulating the filtered water, of an immiscible type (of the type already described above in detail with reference to the tank 2), each adapted to store a reserve of softened water.

The accumulation tank 20 is connected in parallel to the filtering units 3A, 3B for the softening of the water, as well as to the immiscible tank 2 by means of a first shunt pipe 6' of the supply pipe 6 and a second shunt pipe 9' of the extraction pipe 9.

Each of such accumulation tanks 20 is provided with a first inlet connection 300 and with a first outlet connection 400, respectively connected (through the aforesaid two shunt pipes 6', 9') to the supply pipe 6 of a water supply system 600, in order to provide the apparatus 1 with the water from the supply, and to the extraction pipe 9, in order to convey the water flow of the accumulation tank 20 to the user.

The extraction pipe 9 is intercepted towards the user downstream of the connection with the second shunt pipe 9' by a tap 110 that acts as an interception member for the extraction pipe 9 in order to selectively control a request for filtered water flow towards any user, whether an apparatus or a sink.

Each tank for accumulating in an immiscible manner 20 is for example advantageously also obtained with a roll tube coil 20' having section with diameter preferably comprised between 5 and 30 mm.

For example, in order to obtain a 100-liter tank, approximately 320 meters of a roll tube 20' can be used, made of flexible rubber, having external diameter of 22 mm, internal diameter of 20 mm and hence a volume of about 0.31 l/meter.

Of course, without departing from the protective scope of the present patent, each accumulation tank 20 can be otherwise obtained, even in another manner and for example by means of a containment chamber divided by means of a plurality of elements, such as separators or spherules, in a multiplicity of wells or channels capable of flowing the water flow with substantially laminar condition, dividing it in an immiscible manner.

In order to prevent excessive load losses inside the accumulation tank 20, it can be divided into multiple modules, each constituted by an immiscible storage tank (for example four tank modules 20A, 20B, 20C and 20D in accordance with the embodiment of the enclosed FIG. 2) connected to each other in parallel with the respective first inlet connections 300 connected to a common inlet manifold 800 and with the respective first outlet connections 400 connected to a common outlet manifold 900.

Advantageously, the inlet manifold 800 and the outlet manifold 900 are each provided with a plurality of attachments for the hydraulic connection of a variable number of accumulation tanks (20A, 20B, 20C and 20D) in turn constituted by pre-assembled modules with preferably box-like form, advantageously equipped with inlet and outlet connections that are easily connectable to the attachments of the manifolds. In this manner, the installer of the apparatus 1, object of the present invention, does not have to be particularly specialized in the application of the apparatus, object of the invention, and be for example represented by the figure of a generic plumber, or of an operator in the construction field.

The modular structure and the simplicity of installation of the accumulation tanks (20A, 20B, 20C and 20D) and of the relative manifolds 800, 900 allows their facilitated installation both below a sink, for example in a dedicated drawer, in case of rather small filtered water volumes and particularly adapted for a food use of the apparatus 1, both inside a walling and beneath the floor, in case of rather high filtered water volumes and particular adapted for any use in an apartment, in a house or in a building.

As the flow of filtered water continues to arrive in the accumulation tank 20, the latter stores it with substantially laminar flow, without mixing it with that already contained according to a filling direction V1 oriented from the first outlet connection 400 to the first inlet connection 300.

When the aforesaid tap 110 is situated in open or at least partially open position, the supply pipe 6 of the water supply system 600 forces with its supply pressure (usually several bars) a flow of water for use to flow through the accumulation tank 20 from the first inlet connection 300 towards the first outlet connection 400 until it is brought to flow in the second shunt pipe 9' of the extraction pipe 9, determining the at least partial evacuation of the filtered water volume that was stored in the accumulation tank 20 according to an evacuation direction V2 opposite the filling direction V1.

In the case of multiple tanks in parallel, the outlet manifold 900 is connected to the outlet connections 400 of the respective tanks (20A, 20B, 20C, 20D) by means of two branches in parallel, i.e. more in detail:

by means of corresponding filling branches 180, each intercepted by a flow regulator 190 adapted to uniformly distribute, to the respective tanks (20A, 20B, 20C, 20D) through the first outlet connections 400, the filtered water flow coming from the filtering units 3A, 3B through the second shunt pipe 9' of the extraction pipe 9;

and by means of corresponding emptying branches 200 connected in parallel to the filling branches 180 and each intercepted by a check valve 210.

The emptying branches 200 by-pass the flow regulators 190 when the tap 110 is open, and the flow of water for use flows through the accumulation tank 20, supplying the user with the requested flow, first administrating the final volume of filtered water that has been stored in the accumulation tank 20 in the evacuation direction V2 opposite the filling direction V1.

Functionally, when the tap 110 is closed and there is no water consumption by the user, the pump 12 by means of the check valve 170 draws, in the above-described production steps B, the flow of water to be treated from the accumulation tank 20 and forces it to pass through the filtering units 3A, 3B. The flow of water is deionized, thus to obtain a filtered water flow that returns to the accumulation tank 20 through the second shunt pipe 9'; in such a manner, a progressively increasing filtered water volume is stored in the tank in an immiscible manner, with filling direction V1 opposite that of V2, the direction in case of evacuation.

In the case of multiple tanks in parallel (20A, 20B, 20C, 20D), the flow rate regulators 190 balance the filtered water flow produced by the filtering units 3A, 3B between the different tanks in parallel (20A, 20B, 20C, 20D) within which the suction of the pump 12 progressively creates new volume for incoming filtered water.

Functionally, moreover, when the tap 110 is open, after a water flow request by the user, the filtering units 3A, 3B are by-passed and the flow of the supply water is sent to the accumulation tank 20, forcing the volume of liquid contained therein to be discharged through the second shunt pipe 9' with evacuation direction V2 opposite the filling direction V1, which means that the final volume of filtered water accumulated in the accumulation tank 20 is the first to be sent to the user.

This allows emptying the accumulation tank 20 towards the user, first of all supplying all the filtered water volume contained therein and then only after possibly supplying the water that has not yet been filtered contained in the same accumulation tank 20; afterwards, after having evacuated the total water volume that was accumulated in the accumulation tank 20 at the time of tap 110 opening, directly supplying the unfiltered supply water.

Therefore, when there is a request for the flow of use water, there is a free passage between the water supply system 600 and the user through the accumulation tank 20, advantageously without having to force the water flow through the accumulation tank 20 with dedicated pumps.

The water flow rate supplied to the user is not limited by the filtered flow rate which the filtering units 3A, 3B are capable of supplying, nor it is limited by the sizing of the circulation means 12 mechanically and operatively associated with the filtering units 3A, 3B in order to attain the filtering of the water in the single circulation step A. Hence, the circulation means 12 can also be constituted by a low-power pump, such as a vane pump with performances of 0.2 liters/minute, given that usually the tap 110 is closed for greater time periods—and the filtering units 3A, 3B with the pump 12 can work by generating filtered water—than the usually brief time periods in which the tap 110 is open for serving the user.

The speed of the pump 12 can be diversified in the course of the operating step as well as in the course of the production step and the regeneration step, in particular for optimizing the use of the filtering units.

For example, a faster circulation may be provided for the fluid in the units during the start of the production step and a lower speed in the remaining part of the production step, i.e. in the circulation step.

Preferably, the supply pipe 6 of the water supply system 600 is intercepted by a self-cleaning filter 220, in particular of mechanical type, for example with micromesh, arranged to intercept the supply pipe 6 in order to remove possible particles and contaminants present in the water and to avoid clogging the filtering unit 3A, 3B.

Such filter 220 is optional, does not require high maintenance and has meshes preferably comprised in the 25-50 micron range.

Advantageously, the supply pipe 6 is further intercepted, in a per se entirely conventional manner, by a disconnecting element 230 adapted to prevent the water of the desalination apparatus 1 from in some manner returning to the supply system 600. In accordance with an advantageous characteristic of the present invention, the apparatus 1 also comprises a tank 180 of a solubilizing product and insertion means 190, hydraulically connected to the tank 180, susceptible of introducing, with the flow of the supply pipe 6 interrupted by the first solenoid valve 8, an amount of solubilizing product received by the tank 180 into a section 310 of the supply pipe 6 arranged upstream of the capacitors 3A and 3B.

Once the aforesaid solubilizing product amount is inserted in the aforesaid section 310 of the supply pipe 6, the logic control unit 13 controls the advancing of a fluid transport flow rate through the section 310; the amount of such flow rate is determined by means of a timer and/or by means of the flow measure 160, in order to convey the solubilizing product amount into one of the two capacitors 3A and 3B and have it reach and come into contact with the electrodes. The control unit once again stops the flow of fluid of the supply pipe 6, newly controlling the closing of the valve 8 when the solubilizing product amount arrives in the capacitor thrust by the fluid transport flow rate.

The laminar advancement of the flow of the fluid into the supply pipe 6 determines a small dilution of the solubilizing product amount up to the inlet of the capacitors 3A and 3B, allowing the reduction of the amount of solubilizing product to be employed and hence it allows with a small-size tank having an automatic functioning of the apparatus 1 even for very extensive time periods.

At this point, the apparatus 1 will remain off, or in stand-by, for a waiting interval of at least 5 minutes and preferably 10-30 minutes, in which the ionized particles at least partially diffuse in the solubilizing product amount that has stopped in the capacitors 3A and 3B, starting from the interstitial pores present in the conductor material layers of the electrodes.

In accordance with the preferred embodiment of the present invention illustrated in the scheme of FIG. 1, the injection means 190 are obtained with a volumetric syringe 220, which sucks a concentrated solubilizing product from the tank 180 and sends it through delivery pipes 230A, 230B, intercepted by eighth check valves 301, at the section 310 of the supply pipe 6.

Advantageously, the aforesaid volumetric syringe 220 has a product loading chamber divided with a plunger from a pressurized chamber; the latter is connected by means of a shunt pipe 401 intercepted by a ninth valve 240 to the supply pipe 6 arranged upstream of the first valve 8 and connected, by means of an outlet pipe 250, intercepted by a tenth valve, to the ambient pressure drain.

Functionally, with the first valve 8 closed, the CPU controls the opening of the ninth valve 240 which pressurizes the chamber of the syringe 220 by moving the plunger, overcoming the reaction force of elastically pliable means (such as a simple spring), so as to emit the solubilizing product amount outside the product loading chamber, making it travel along the relative delivery pipe 230A, 230B until it is inserted in the section 310 of the supply pipe 6.

At this point, the CPU closes the third valve 240 and opens the tenth valve 260 by allowing the plunger of the syringe 220 to pull back under the action of the spring, causing reduced pressure that once again draws a new amount of product from the tank 180 through a provided connection pipe 280 intercepted by a check valve 290.

With the term "solubilizing product", it must be intended any one product, in particular advantageously available in a solution for facilitated introduction in the capacitors 3A and 3B, susceptible of increasing the solubility of the specific ionized particles with which it is intended to interact in the provided application, by increasing the precipitation threshold thereof. For example, it will be constituted by a solution containing a counterion capable of inhibiting, within certain limits, the precipitation of the ion contained in the fluid to be treated; for example, it can be constituted by an acidic solution for the solubilization of carbonates or nitrates.

Forming the object of the present invention is also a method for treating a fluid containing ionized particles and in particular for desalinating the water of a water supply system, by means of the apparatus 1, in particular but not exclusively of the above-described type, whose reference numbers will be maintained for simplicity of exposition. The method provides for the cyclic repetition of at least one circulation step and at least one production step. Preferably, as will be clarified below, at the end of each circulation step and before a new production step, a regeneration step will be provided for restoring the functionalities (capture capacity) of the filtering unit 3 (or 3A and 3B in the case of two units).

More in detail, in accordance with the idea underlying the present invention, during the circulation step (which corresponds to the circulation condition indicated with A in the enclosed figures) the fluid to be purified circulates in the hydraulic circuit 100 through the filtering unit 3 (or 3A and 3B in the case of two units) and the immiscible tank 2 accumulating in the latter at least one operating amount of fluid with increasing concentration of ionized particles.

During the production step (which corresponds to the circulation condition indicated with B in the enclosed figures), the operating amount of fluid to be purified is introduced into the hydraulic circuit by the supply pipe 6, and an equivalent operating amount of fluid with increasing concentration of ionized particles is forced to exit from the immiscible tank 2, and, advantageously passing through the filtering unit 3 (or 3A and 3B in the case of two units) where it is further purified, then forced to exit from the extraction pipe 9.

The operating amount of fluid in each cycle is determined during the production step by the amount of fluid that enters through the supply pipe 6 and that exits through the extraction pipe 9. The logic control unit determines the moment of the switching between the production step and the circulation step (i.e. between the two different conditions of the configuration of the hydraulic circuit 100: production B and circulation A) through a timer or through diagnostic means 19 in particular constituted by two conductivity meters 19' as already specified above and as will be discussed in more detail hereinbelow.

Advantageously, the apparatus 1 comprises two filtering units 3A and 3B and consequently the method provides that each works cyclically between the two operating and regeneration steps, substantially in a substantially staggered manner with respect to the other. Therefore, while one filtering unit 3A, 3B is in operating step, in which it purifies the flow that traverses it and during which it is subjected to the circulation and production steps, the other filtering unit 3B, 3A is in regeneration step, in which it does not treat the fluid and the ionized particles accumulated therein are removed.

The overall duration of the production step and the recirculation step decreases with the increase of the incoming salinity.

When this time becomes less than the duration of the regeneration step, it becomes possible to insert an additional filtering unit for increasing the productivity at the outlet, thus using three or more filtering units.

The possibility of having multiple filtering units (and thus even more than two) allows the apparatus to operate with operating steps having a lower pressure drop. For example, if the time of the production step and circulation step is less than the production time, it is possible to provide for e.g. two filtering units in regeneration and one in production. With water with high salinity, it is indeed probable that the exhaustion time of the cell (production plus regeneration) is less than the regeneration time.

In addition, with water with high salinity it is possible to provide for a rather short production time and a rather long regeneration time, and hence a rather voluminous tank since it must contain a very wide gradient.

The volume of the tank is equal to the volume of the water treated in a cycle (i.e. equal to the sum of the production and recirculation), or it is equal to a multiple of the volume of the water treated in a cycle.

In accordance with the preferred embodiment of the present invention, each filtering unit 3A, 3B is a device with flow-through capacitors provided with at least one cell having counterfaced electrodes between which the flow of fluid to be treated containing ionized particles is susceptible of flowing.

For the purpose of the method, object of the present invention, each of the two devices with flow-through capacitors can be of any known type and in particular of the above-described type.

With such devices with flow-through capacitors 3A, 3B, during the operating step, the flow of fluid to be treated is forced to pass through the electrodes charged with different polarity of the cells so as to cause a progressive accumulation of the ionized particles contained in the fluid on the electrodes.

During the subsequent regeneration step, the ionized particles are removed from the electrodes of the cell.

Advantageously, according to a particular characteristic of the present invention, the step of regenerating a flow-through capacitor 3A, 3B comprises a washing step, which is actuated at the circulation step of the other device with flow-through capacitors 3A, 3B. In addition, in such regeneration step, with the electrodes deactivated, a flow of washing fluid received by the supply pipe 6 is forced to pass through the cells with ensuing removal of the ionized particles accumulated on the electrodes.

The circulation step of a flow-through capacitor 3A, 3B, in which the supply is not employed, allows the use of the same supply for washing the regeneration step of the other flow-through capacitor 3B, 3A.

The step of regenerating each device with flow-through capacitors 3A, 3B also comprises a short-circuit step and a step of reversing the polarity of the electrodes of the cell, such steps being substantially implemented during the production step of the other device with flow-through capacitors.

The passage from the circulation step to the production step and from the production step to the circulation step is determined by the detection—by diagnostic means 19 associated with at least one section of the hydraulic circuit—of the exceeding of a threshold value of a characteristic of the fluid.

The diagnostic means in particular allow determining the passage from the production step to the circulation step, i.e. the moment in which the fluid treated by the relative device with flow-through capacitor 3A, 3B is no longer able to supply a sufficiently purified liquid such that it is necessary to continue the operating step with the circulation step. Such switching corresponds with the operating amount of treated fluid drawn from the extraction pipe 9 and the same operating amount of fluid introduced into the circuit 100 through the supply pipe 6.

The subsequent switching operated by the logic control unit aimed to initiate, with the other flow-through capacitor 3B, 3A, a new production step substantially starts when, at the inlet thereof, it is possible to substantially bring the first fluid treated in the circulation step by the preceding flow-through capacitor 3A, 3B, so as to treat the already nearly purified fluid first. Knowing the working time (with a timer associated with the control unit) of the preceding flow-through capacitor 3A, 3B, or knowing the flow amount treated by the preceding flow-through capacitor 3A, 3B, it is possible to determine the switching of the other flow-through capacitor 3B, 3A so that it starts the new production step on the fluid that was first treated in the preceding circulation step of the other flow-through capacitor 3A, 3B.

Such switching from the regeneration step to the production step can therefore be determined by calibrating the apparatus 1 and setting a cyclic time interval or a repetitive flow amount detected by the fluid amount detector 190 in a section of the circuit 100, as indicated for example in the dashed line in the enclosed figures.

Preferably, nevertheless, the diagnostic means 19 comprise two conductivity meters 19' and 19". The first conductivity meter 19' is arranged at the outlet of the two devices with flow-through capacitors 3A, 3B which detect a preset threshold value of maximum conductivity such that the control unit, once such value is detected, controls the passage of the device with flow-through capacitors 3A, 3B from the production condition B to the circulation condition A (in particular operating with the above-described management of the valves). This occurs when the fluid, for example the water intended for the user, no longer meets the desired quality characteristics set through the first conductivity meter 19'. The device with capacitors 3A, 3B, even if it can no longer serve the user, has a residual capture capacity that is exploited in the circulation step in order to create an operating amount of fluid with increasing concentration of ionized particles for a subsequent treatment in the subsequent production step in particular by the other device (or even by the same device if the tank comprises a multiple of such amount) in order to newly create a sufficiently purified fluid.

Upon varying the conditions of the incoming fluid, the production step will be extended for a greater or lesser time and a greater or lesser operating amount of purified fluid will be sent to the user through the extraction pipe 9. Analogously, a greater or lesser operating amount of new fluid to be treated will enter from the supply pipe 6.

The second conductivity meter 19" is arranged at the outlet of the immiscible tank 2 on the common initial section 40 of the delivery pipes 14A, 14B and is adapted to detect a preset threshold value of minimum conductivity, which is exploited by the logic control unit in order to control the passage of the device with flow-through capacitors 3A, 3B, which is in circulation condition, into the regeneration condition and the passage of the other device with flow-through capacitors, which has terminated the regeneration condition, into the production condition.

The second conductivity meter 19" detects the arrival of the conductivity drop of the fluid due to the preceding switching from the production condition B to the recirculation condition A. Such fluid front with low salinity corresponds to the first fluid discarded immediately after the switching in recirculation A and is susceptible of being easily purified in the subsequent production condition B by the new flow-through capacitor 3A, 3B in order to obtain a highly purified fluid.

The second conductivity meter 19" detecting, through a minimum conductivity measurement, the closing of the switching from the production step to the circulation step, it is therefore capable of automatically varying the duration of the circulation step and the start of the new production step, thereby adapting to the variation of the flow amount that has entered and exited in the preceding production condition in order to maintain constant the water quality level to the user.

The finding thus conceived therefore attains the pre-established objects.

The invention claimed is:

1. Method for treating a fluid containing ionized particles, by means of an apparatus (1) provided with:
   a hydraulic circuit (100) intercepted by at least one immiscible storage tank (2), susceptible of containing at least one fluid reserve with variable concentration of ionized particles and by at least one cyclically regenerating filtering unit (3, 3A, 3B), connected to said at least one immiscible storage tank (2) wherein at least one of said cyclically regenerating filtering unit (3, 3A, 3B) is provided with at least one cell (30) having counterfaced electrodes between which a flow of fluid to be treated containing ionized particles is susceptible of flowing;
   a supply pipe (6) connected to said hydraulic circuit (100) upstream of said at least one immiscible storage tank (2) for introducing fluid to be purified;
   an extraction pipe (9) connected to said hydraulic circuit (100) downstream of said at least one cyclically regenerating filtering unit (3, 3A, 3B) for conveying the purified fluid to the user;

wherein said method cyclically comprises:
   at least one circulation step (A), in which said fluid circulates in said hydraulic circuit (100) through said at least one cyclically regenerating filtering unit (3, 3A, 3B) and said at least one immiscible storage tank (2), accumulating in said at least one immiscible storage tank (2) at least one operating amount of fluid with increasing concentration of ionized particles;
   a production step (B) in which one said operating amount of fluid to be purified is introduced into said hydraulic circuit (100) by said supply pipe (6), and an equivalent operating amount of fluid with increasing concentration of ionized particles is forced to exit from said at least one immiscible storage tank (2) and is drawn by said extraction pipe (9).

2. Method for treating a fluid according to claim 1, wherein during said production step, said operating amount of fluid with increasing concentration of ionized particles that has exited from said at least one immiscible storage tank (2) is forced to pass through said at least one cyclically regenerating filtering unit (3, 3A, 3B) before being drawn by said extraction pipe (9).

3. Method for treating a fluid according to claim 1, by means of an apparatus provided with at least two filtering units (3A, 3B), wherein each said at least two filtering unit (3A, 3B) operates cyclically in a substantially staggered manner with respect to the other between an operating step (C), in which each said at least two filtering unit purifies the flow that traverses it and during which it is subjected to said circulation (A) and production (B) steps, and at least one regeneration step (D), in which it does not treat the fluid and the ionized particles accumulated therein are removed.

4. Method for treating a fluid according to claim 3, by means of an apparatus in which each filtering unit (3, 3A, 3B) is a device with flow-through capacitors provided with at least one cell (30) having counterfaced electrodes between which the flow of fluid to be treated containing ionized particles is susceptible of flowing, wherein during said operating step (C) said flow of the fluid to be treated is forced to pass through the electrodes charged with different polarity of said cell (30) with progressive accumulation of said ionized particles on said electrodes; during said regeneration step (D), the ionized particles are removed from the electrodes of said cell (30); said regeneration step (D) comprising a washing step (D1), which is actuated at the circulation step (A) of one of the other filtering unit (3, 3A, 3B) that is a device with flow through capacitors and in which, with said electrodes deactivated, a flow of washing fluid received by said supply pipe (6) is forced to pass through the cell (30) with ensuing removal of said ionized particles accumulated on said electrodes.

5. Method for treating a fluid according to claim 4, wherein the step (D) of regenerating each said device using flow-through capacitors comprises at least one short-circuit step and at least one step of reversing the polarity of the electrodes of said cell (30), such steps being substantially implemented during the production step (B) of the other device with flow-through capacitors.

6. Method for treating a fluid according to claim 1, wherein the passage from said circulation step (A) to said production step (B) and from said production step (B) said circulation step (A) is determined by the detection—by diagnostic means (19) of the apparatus associated with at least one section of said hydraulic circuit (100)—of a threshold value of a characteristic of the fluid.

7. Method for treating a fluid according to claim 4, wherein the passage from said circulation step (A) to said production step (B) and from said production step (B) to said circulation step (A) is determined by the detection—by diagnostic means (19) of the apparatus associated with at least one section of said hydraulic circuit (100)—of a threshold value of a characteristic of the fluid and wherein said diagnostic means (19) of the aforesaid apparatus comprise:—at least one first conductivity meter (19') arranged at the outlet of a common terminal section (50) of said two filtering units (3A, 3B), susceptible of detecting a threshold value of maximum conductivity and of transmitting it to a control unit;—at least one second conductivity meter (19") arranged at the outlet of said at least one immiscible storage tank (2), susceptible of detecting a threshold value of minimum conductivity and of transmitting it to said control unit; wherein said control unit controls:—the passage from said production step (B) to said circulation step (A) of the filtering unit (3, 3A, 3B) in operating step (C) upon receiving a threshold value of maximum conductivity;—the passage from said circulation step (A) of the filtering unit (3, 3A, 3B) which terminates the operating step (C) to the production step (B) of the other filtering unit (3, 3A, 3B) which starts the production step (B) upon receiving a threshold value of minimum conductivity.

8. Method for treating a fluid according to claim 6, by means of the aforesaid apparatus whose diagnostic means (19) comprise at least one detector of the amount of fluid (190) in communication with a logic control unit; said logic control unit controlling the aforesaid switching upon the reoccurrence of the passage of a preset operating amount of fluid.

9. Method for treating a fluid according to claim 1, wherein the passage from said circulation step (A) to said production step (B) and from said production step (B) to said circulation step (A) is determined by a logic control unit by means of a timer.

* * * * *